United States Patent
Dearsley et al.

(10) Patent No.: US 11,409,377 B2
(45) Date of Patent: Aug. 9, 2022

(54) FOLDABLE MOUSE

(71) Applicant: Microsoft Technology Licensing, LLC, Redmond, WA (US)

(72) Inventors: Simon Cameron Dearsley, Bellevue, WA (US); Randal Joseph Kinser, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/111,504

(22) Filed: Dec. 3, 2020

(65) Prior Publication Data

US 2021/0342018 A1    Nov. 4, 2021

Related U.S. Application Data

(60) Provisional application No. 63/017,635, filed on Apr. 29, 2020.

(51) Int. Cl.
| | |
|---|---|
| *G06F 3/0354* | (2013.01) |
| *G06F 3/038* | (2013.01) |
| *G06F 3/01* | (2006.01) |
| *H02J 50/10* | (2016.01) |
| *G06F 3/044* | (2006.01) |

(52) U.S. Cl.
CPC .......... *G06F 3/03543* (2013.01); *G06F 3/016* (2013.01); *G06F 3/038* (2013.01); *G06F 3/044* (2013.01); *H02J 50/10* (2016.02); *G06F 2203/0333* (2013.01); *G06F 2203/0384* (2013.01)

(58) Field of Classification Search
CPC ...... G06F 3/03543; G06F 3/016; G06F 3/038; G06F 3/044; G06F 2203/0333; G06F 2203/0384; H02J 50/10
See application file for complete search history.

(56) References Cited

U.S. PATENT DOCUMENTS

| | | |
|---|---|---|
| 5,570,112 A | 10/1996 | Robinson |
| 7,212,189 B2 | 5/2007 | Shaw et al. |
| 2005/0116934 A1 | 6/2005 | Yin et al. |
| 2006/0022943 A1 | 2/2006 | Johnson et al. |
| (Continued) | | |

OTHER PUBLICATIONS

"International Search Report and Written Opinion Issued in PCT Application No. PCT/US2021/024752", dated Jul. 9, 2021, 13 Pages.

(Continued)

*Primary Examiner* — Peter D McLoone
(74) *Attorney, Agent, or Firm* — NovoTechIP International PLLC

(57) ABSTRACT

A foldable computer mouse is provided that includes a deformable body configurable to be formed into a first expanded configuration usable for receiving inputs for controlling a computing device and a second folded configuration in which a first portion of the deformable body is folded over a second portion of the deformable body. The mouse also includes an input sensor disposed on the deformable body and configured to detect tactile input, a motion tracking component disposed on the deformable body and configured to detect movement of the computer mouse, and a communications component configured to wirelessly communicate tactile input and motion tracking data to the computing device.

16 Claims, 20 Drawing Sheets

(56) References Cited

U.S. PATENT DOCUMENTS

| | | | |
|---|---|---|---|
| 2007/0257887 A1 | 11/2007 | Chang | |
| 2010/0053084 A1 | 3/2010 | Chatterjee et al. | |
| 2012/0176317 A1 | 7/2012 | Jin | |
| 2015/0035757 A1* | 2/2015 | Mahlmeister | A63F 13/213 |
| | | | 345/173 |
| 2016/0364020 A1* | 12/2016 | Deng | G06F 3/03543 |
| 2017/0192536 A1* | 7/2017 | Wang | G06F 3/03543 |
| 2020/0412157 A1* | 12/2020 | Vlasov | G06F 3/038 |
| 2021/0004092 A1* | 1/2021 | Lin | G06F 3/038 |

OTHER PUBLICATIONS

"Attaching wireless mouse to laptop", Retrieved from: https://www.reddit.com/r/DIY/comments/33z0zn/attaching_wireless_mouse_to_laptop/, Jan. 25, 2008, 7 Pages.

"Microsoft CZV-00005 Arc Mouse (Light Gray)", Retrieved from: https://www.amazon.in/Microsoft-1791-Arc-Mouse-Light-Gray/dp/B077PM14QN/ref=asc_df_B077PM14QN/?tag=googleshopdes-21&linkCode=df0&hvadid=397083637568&hvpos=1o1&hvnetw=g&hvrand=9740705657045714666&hvpone=&hvptwo=&hvqmt=&hvdev=c&hvdvcmdl=&hvlocint=&hvlocphy=1007826&hvtargid=pla-836669467839&psc=1&ext_vrnc=hi, Retrieved Date: Feb. 10, 2020, 6 Pages.

Ridden, Paul, "Tiny Swiftpoint mouse designed for use on laptops", Retrieved from: https://newatlas.com/swiftmouse-palm-rest-laptop-mouse/17450/, Jan. 4, 2011, 6 Pages.

Sze, Kelvin, "Microsoft Arc Wireless Mouse is Foldable", Retrieved from: http://www.itechnews.net/2008/09/11/microsoft-arc-wireless-mouse-is-foldable/#more-13452, Sep. 11, 2008, 2 Pages.

"Lenovo GX30K69566 Yoga Mouse, (Wireless/Dual Mode/Silver)", Retrieved from: https://www.amazon.in/Lenovo-GX30K69566-Mouse-Wireless-Silver/dp/B01N4QBV9J/ref=pd_sbs_147_35?_encoding=UTF8&pd_rd_i=B01N4QBV9J&pd_rd_r=ca908559-6a1f-4f2c-a8df-672d5b14e155&pd_rd_w=6pLFb&pd_rd_wg=JDrbL&pf_rd_p=fbf43daf-8fb3-47b5-9deb-ae9cce3969a9&pf_rd_r=HG8WJ1PX95RR4DF9JS6T&psc=1&refRID=HG8WJ1PX95RR4DF9JS6T Retrieved Date: Feb. 10, 2020, 8 Pages.

* cited by examiner

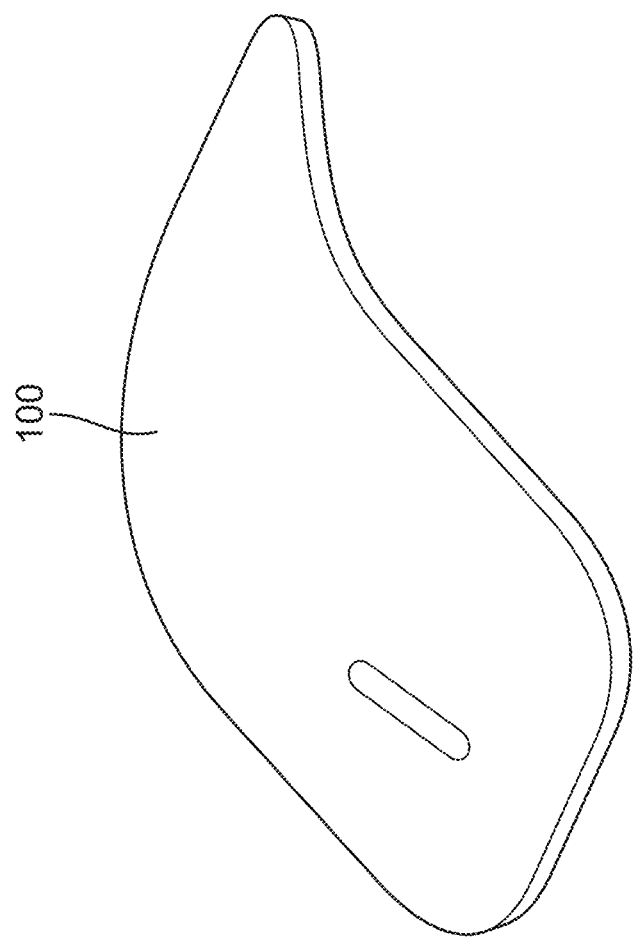

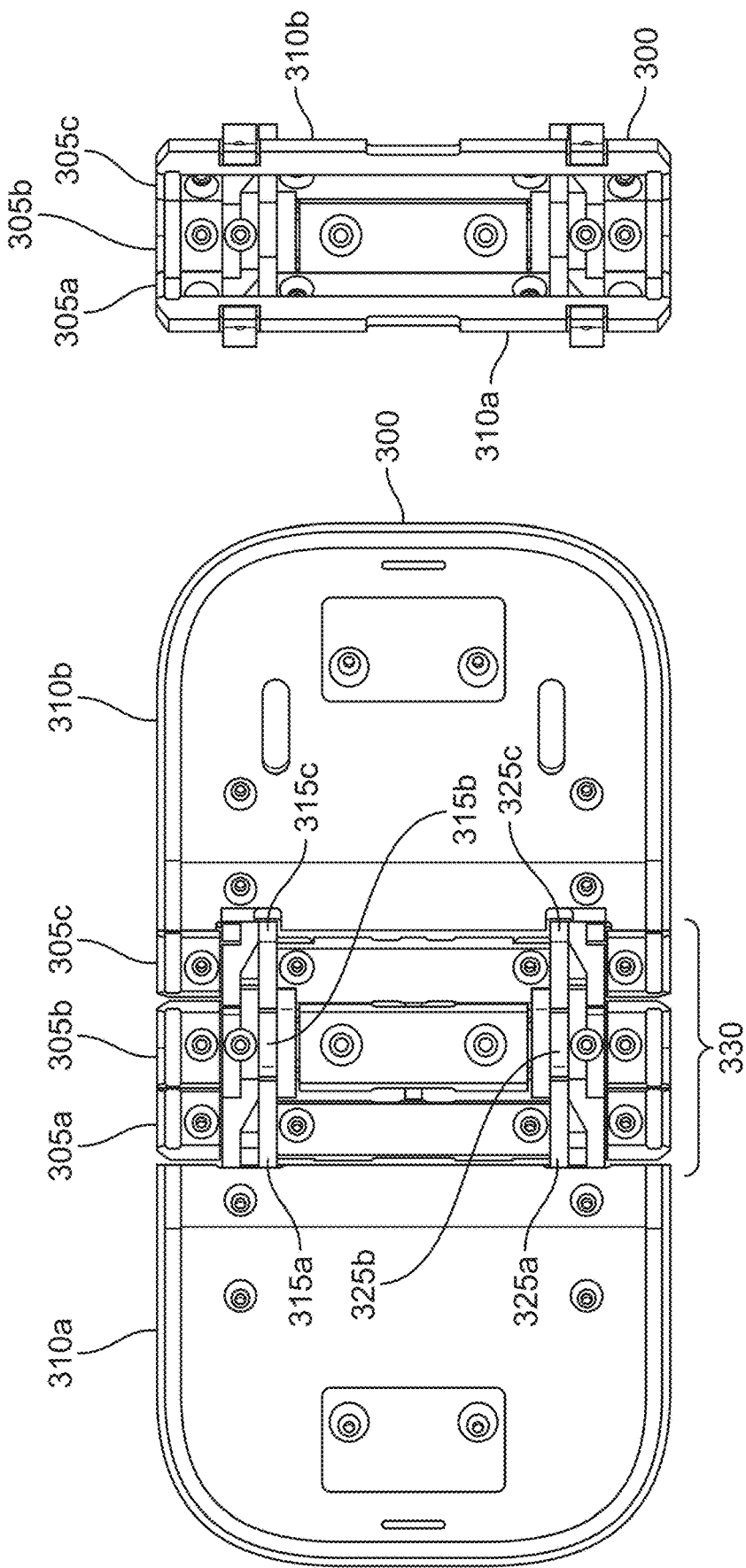

FOLDABLE MOUSE

CROSS-REFERENCE TO RELATED APPLICATIONS

This application claims the benefit of priority from U.S. Provisional Patent Application Ser. No. 63/002,285, filed on Apr. 29, 2020, and entitled "Foldable Mouse."

BACKGROUND

A computer mouse is commonly used input device for a variety of computer systems. Portable computers, such as a laptops and tablet computing devices, have become increasing popular. However, conventional computer mouse designs are often too bulky or inconvenient to carry around with a portable computing device and smaller travel-sized computer mouse designs often lack an ergonomic design and may be unconformable to use. There are significant areas for new and approved computer mouse designs that are portable and ergonomic.

SUMMARY

An example data processing system according to the disclosure may include a processor and a computer-readable medium storing executable instructions. The executable instructions include instructions configured to cause the processor to perform operations including obtaining source data comprising a two-dimensional (2D) image, three-dimensional (3D) image, or depth information representing a face of a human subject, and generating a 3D model of the face of the human subject based on the source data by analyzing the source data to produce a coarse 3D model of the face of the human subject and refining the coarse 3D model through free form deformation to produce a fitted 3D model.

An example computer mouse according to the disclosure includes a deformable body configurable to be formed into a first expanded configuration usable for receiving inputs for controlling a computing device and a second folded configuration in which a first portion of the deformable body is folded over a second portion of the deformable body; an input sensor disposed on the deformable body and configured to detect tactile input from a user; a motion tracking component disposed on the deformable body and configured to detect movement of the computer mouse; and a communications component configured to wirelessly communicate tactile input and motion tracking data to the computing device.

Another example computer mouse according to the disclosure includes a deformable body configurable to be formed into a first expanded configuration usable for receiving inputs for controlling a computing device and a second folded configuration in which the deformable body is folded along a central portion of the deformable body; an input sensor disposed on the deformable body and configured to detect tactile input from a user; a motion tracking component disposed on the deformable body and configured to detect movement of the computer mouse; and a communications component configured to wirelessly communicate tactile input and motion tracking data to the computing device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A shows an example of a foldable mouse.

FIG. 3A shows a view of the underside of the deformable body of the foldable mouse from the preceding figures in which the deformable body is in the expanded configuration.

FIG. 3B shows a view of the underside of the deformable body of the foldable mouse from the preceding figures in which the deformable body is in the folded configuration.

DETAILED DESCRIPTION

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A foldable computer mouse is provided that solves the technical problem outlined above by being both portable and ergonomic. The computer mouse of the instant application provides a technical solution to this problem by including a deformable body configured to be formed into a first folded configuration in which the computer mouse has a small portable size and into a second expanded configuration in which the computer mouse expands into an ergonomic form usable for receiving user inputs for controlling a computing device. The computer mouse may provide numerous technical benefits. The foldable form factor of the mouse may allow the mouse to be folded around at least a portion the case or housing of a portable computing device with which the mouse is to be used, such as but not limited to a laptop or table computing device. Attaching the mouse to the case of the computing device reduces the likelihood of the computer mouse be misplaced while traveling with the computing device. Furthermore, the computer mouse may also receive power from the computing device while the mouse is attached to the case or housing of the computing device. This allows the computer mouse to be charged and ready to be used.

Figure 1B:
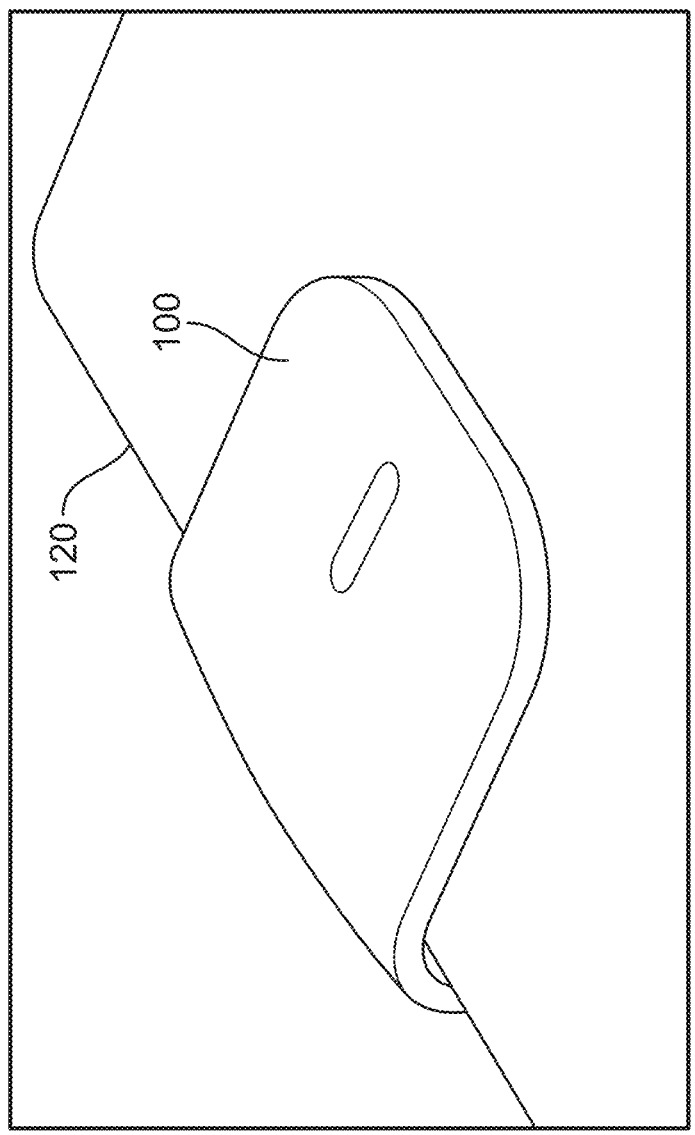
FIG. 1B shows another example of the foldable mouse illustrated in FIG. 1A that is folded over a portion of a housing of a computing device.

FIG. 1A shows an example computer mouse 100 according to the disclosure. The mouse 100 is in the expanded configuration in which the computer mouse provides an ergonomic form usable for receiving inputs for controlling a computing device. The mouse 100 has a curved, ergonomic shape to allow the mouse to be comfortably held in the hand of a user. The mouse 100 is designed for use by either a left-handed or right-handed user. FIG. 1B shows an example implementation of the mouse 100 from FIG. 1A in which the computer mouse is in the folded configuration. In this example implementation, the body of the mouse 100 may be folded into an arcuate configuration that conforms to the exterior housing of a computing device 120. The computing device 120 may be a laptop, tablet computing device, or other portable computing device. The mouse 100 may be configured to affix to the housing of the computing device 120 using magnets or other means, which will be discussed in greater detail in the examples that follow. A technical benefit of the mouse being able to conform to the exterior of the housing of the computing device 120 is that the mouse 100 may be removably affixed to the housing of the device which may significantly reduce the likelihood of the mouse 100 being misplaced while traveling. Furthermore, the flexibility of the mouse 100 permits the mouse to conform to the exterior housings of computing devices which have different sizes.

The body of the mouse 100 has a first arcuate configuration having a first curvature when formed into the folded configuration, such as that shown in FIG. 1B. The body of the mouse 100 has a second arcuate configuration having a second curvature formed into the expanded configuration, such as that shown in FIG. 1A. The first curvature is greater than the second curvature. Another technical benefit provided by the mouse 100 is that the mouse may be transformed from the first arcuate configuration which is convenient for transporting the mouse 100 to the second arcuate configuration which provides an ergonomic shape that permits a user to comfortably hold the mouse 100 while using the mouse 100.

Figure 1C:
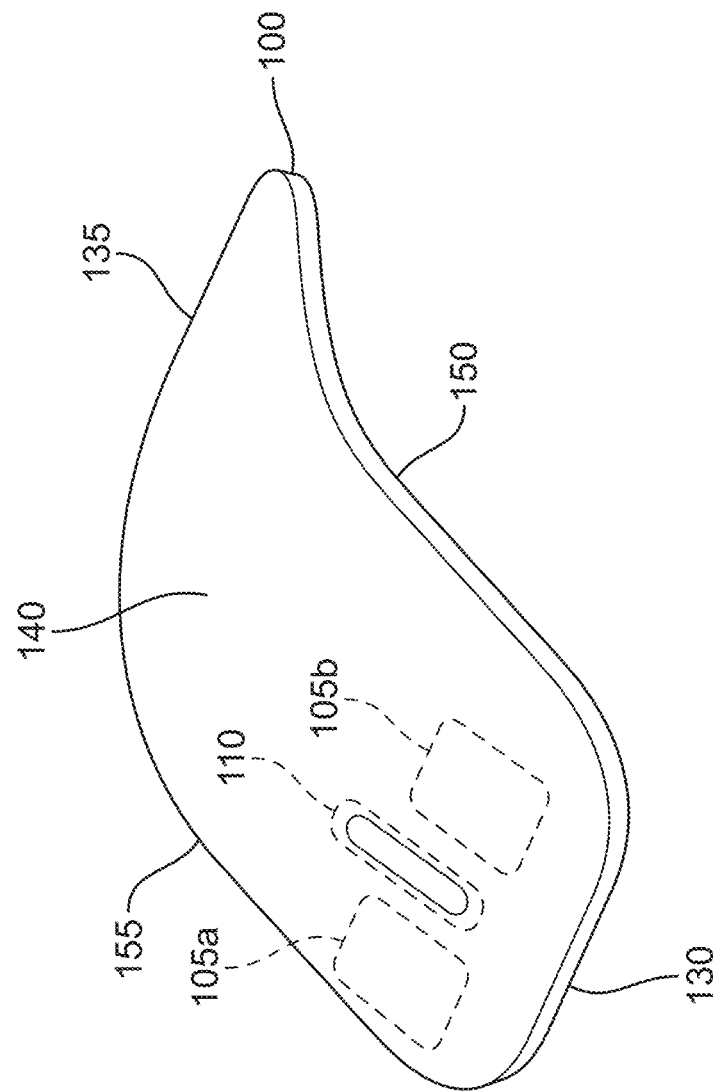
FIG. 1C shows another example of the foldable mouse illustrated in FIG. 1A.

FIG. 1C shows an example of the mouse 100 from FIG. 1A in which several touch sensitive regions of the mouse 100 have been highlighted. The mouse 100 may have one or more touch sensitive regions that are configured to detect tactile inputs. In the example implementation illustrated in FIG. 1C, three such touch sensitive regions are included on the mouse 100. The mouse 100 has a first end 130, also referred to herein as the "nose" of the mouse 100, and a second end 135, also referred to herein as the "tail" of the mouse 100. FIG. 1B shows an upper surface 140 of the mouse 100, which is also referred to herein as the "top" of the mouse 100. The mouse 100 also includes a first side 155, also referred to herein as the "right" side of the mouse 100, and a second side 150, also referred to herein as the "left" side of the mouse 100. A user of the mouse 100 would typically rest their hand on the upper surface 140 of the mouse 100 with the user's palm oriented toward the tail of the computer mouse and the user's fingers oriented toward the nose of the mouse 100. The curved shape of the mouse 100 provides an ergonomic shape that is comfortable to hold as the user utilizes the mouse 100.

The example implementation illustrated in FIG. 1C includes two touch sensitive regions 105a and 105b that are oriented toward the nose of the mouse 100. The touch sensitive regions 105a and 105b may comprise a capacitive sensor, force sensor, or other type of sensor that is configured to detect tactile inputs. The touch sensitive region 105a may serve a similar function as the right mechanical button on a conventional two-button mouse, and the touch sensitive region 105b may serve a similar function as the left mechanical button on a conventional two-button mouse. The user may tap or apply pressure to the touch sensitive region 105a to generate a right mouse button input or to the touch sensitive region 105b to generate a left mouse button input. The example implementation of the mouse 100 illustrated in FIG. 1C also includes a touch sensitive region 110 that is disposed between the touch sensitive regions 105a and 105b. The touch sensitive region 110 may serve a similar purpose as a mechanical scroll wheel or middle mouse button on other conventional computer mouse implementations.

Figure 8:
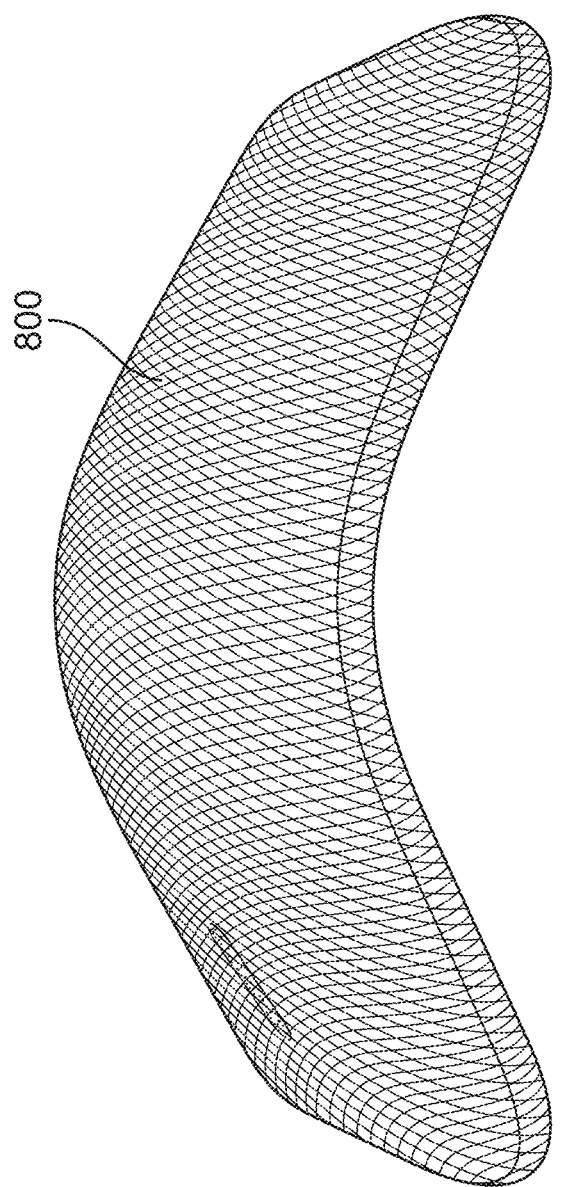
FIG. 8 shows the mouse from the preceding figures with a cover over the deformable body and the expandable shell of the foldable mouse.

The mouse 100 utilizes touch sensitive regions for receiving inputs instead of mechanical elements, such as buttons and a scroll wheel, to provide a more compact and streamlined form factor that may be folded for portability. However, in other implementations, one or more buttons and/or a scroll wheel may be integrated into the mouse 100 instead of one or more of the touch sensitive regions. The touch sensitive regions 105a, 105b, and 110 are represented by dotted lines in FIG. 1C because the sensors are disposed in, or beneath, a cover material that covers the body of the mouse 100. The cover may be made of various type of material that are thin enough to permit tactile inputs to be detected by the touch sensitive regions 105a, 105b, and 110 while being durable enough to protect the computer mouse 100 from damage while being transported with the computing device. The cover may include a woven or knitted fabric or may include other types of material, such as a rubberized material. An example implementation of the mouse 100 that includes a knitted cover is shown in FIG. 8.

The mouse 100 may include a feedback unit (not shown in FIG. 1C) that is configured to provide haptic feedback to the user in response to the user touching one of the touch sensitive regions 105a, 105b, or 110. The feedback unit may be configured to generate a vibration in response to the user touching one of the touch sensitive regions 105a and 105b, e.g., to provide a sensation to the user that may simulate the feeling of clicking a physical button. The feedback unit may be configured to generate a vibration in response to the user touching the touch sensitive region 110, e.g., to provide a sensation that may simulate the feeling of scrolling a physical scroll wheel. The feedback unit may include a speaker that outputs a sound when one of the touch sensitive regions 105a, 105b, or 110 are touched. For example, the feedback unit may output a clicking sound that simulates the clicking of a physical button similar to those used on many computer mice in response to the user touching the one of the touch sensitive regions 105a and 105b. The feedback unit may output a sound similar to that produced by a physical scroll wheel in response to the user touching the touch sensitive region 110. The user may, for example, run a finger along the touch sensitive region 110 to simulate scrolling with a scroll wheel.

Figure 2A:
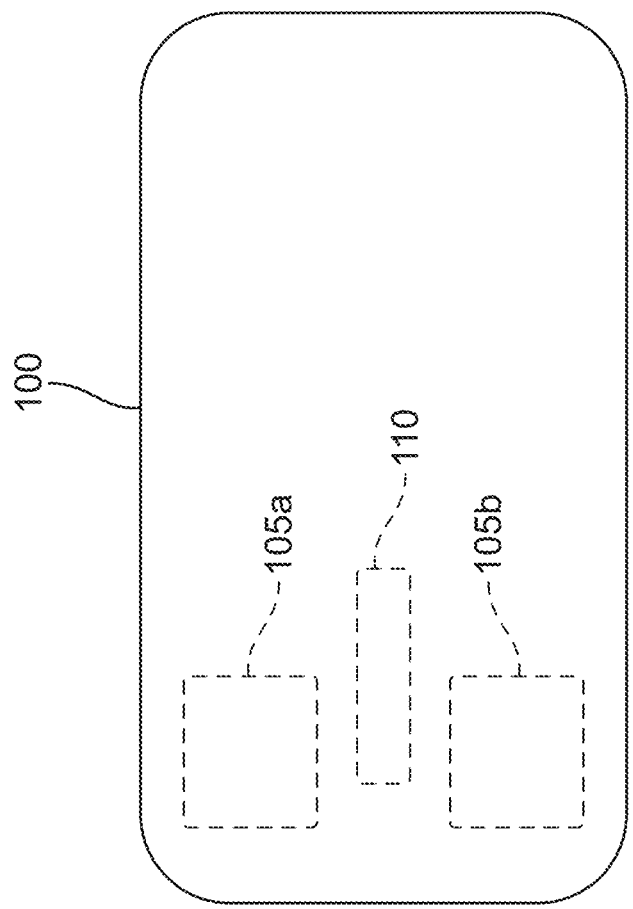
FIG. 2A shows a top view of the foldable mouse from FIG. 1A.
Figure 2B:
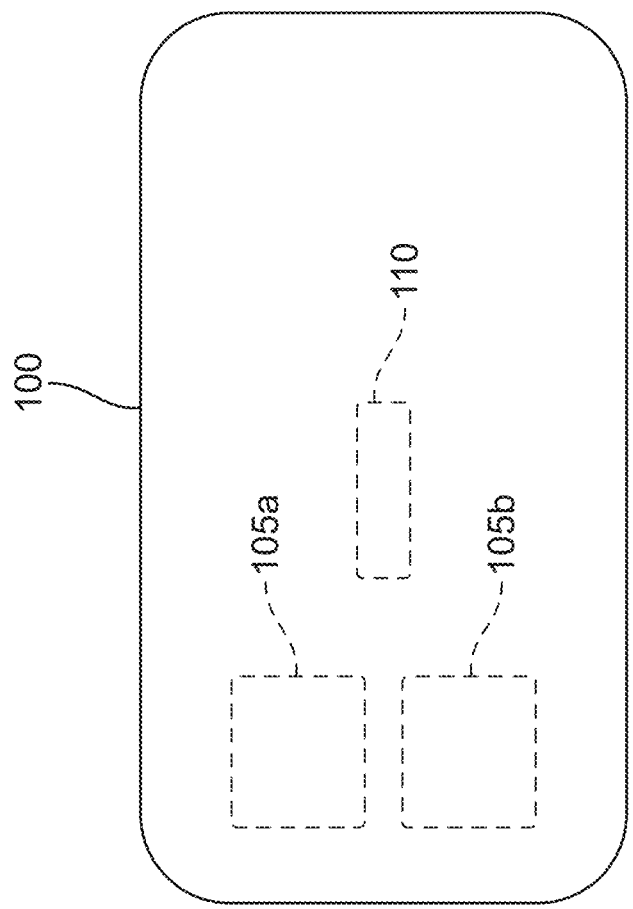
FIG. 2B shows another top of foldable mouse of FIG. 1A.

FIG. 2A shows a top view of the mouse 100 from FIGS. 1A-1C. The locations of the touch sensitive regions 105a, 105b, and 110 are similar to the example illustrated in FIG. 1C. FIG. 2B shows another view of the top of the mouse 100 in which the touch sensitive region 110 is located closer to the midpoint of the body of the mouse rather than toward the nose of the computer mouse 100. The layout and shape of the touch sensitive regions 105a, 105b, and 110 illustrated in FIGS. 1C, 2A, and 2B are merely examples and other implementations may include touch sensitive regions that are in additional locations and/or different locations on the mouse 100. Moreover, the touch sensitive regions may have other geometric (e.g., oval or circular) or non-geometric shapes. The number of and location of the touch sensitive region 110 may vary in other implementations.

Figure 2C:
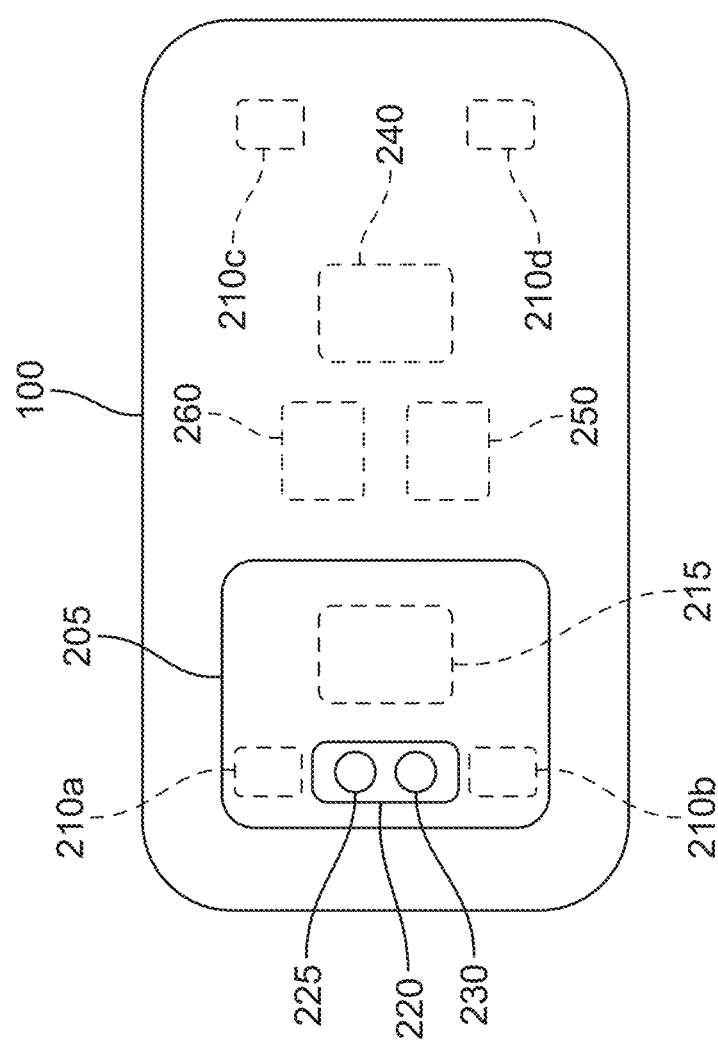
FIG. 2C shows a view of the underside of the foldable mouse from FIGS. 1A-2B.

FIG. 2C is a bottom view of the mouse 100 from the preceding examples. FIG. 2C illustrates several features that may be included in implementations of the mouse 100. The mouse may include magnets disposed along the bottom surface of the mouse that may be used to removably affix the computer mouse 100 to the case or housing of the computing device 120 when the mouse is in the folded configuration. The example illustrated in FIG. 2C includes four magnets 210a, 210b, 210c, and 210d that are disposed at either end of the mouse. The mouse 100 may optionally include magnets disposed along the underside of the mouse to securely affix the mouse 100 to the case or housing of the computing device. The number of magnets included and the arrangement of the magnets along the underside of the mouse 100 may vary depending upon the configuration of the case or housing of the computing device 120 where the mouse is intended to be folded around at least a portion of the case or housing of the mouse 100.

The mouse 100 may also include an inductive charging coil 215 for wirelessly charging a battery of the mouse (not shown). The charging coil 215 may be configured to align with a charging coil disposed on or within the case or housing of the computing device 120, and the mouse 100 may be configured to wirelessly charge when affixed to the case or housing of the computing device 120. The magnets 210 may be arranged to align the coil 215 with a coil of the computing device when the mouse 100 is magnetically affixed to the computing device. The inductive charging coil 215 may be disposed beneath a panel 205. The panel 205 is formed of a material that allows a magnetic field generated by an external inductive charging coil, such as that disposed on the case or housing of the computing device 120, to pass through the panel 205 to the inductive panel. The panel 205 may be formed from plastic to minimize the weight added to the mouse 100. Other materials that do not interfere with magnetic field, such as glass may also be used. In some implementations, the panel 205 forms a portion of the cover of the mouse 100. For example, a fabric cover encloses the mouse and adheres to, or under, the panel 205.

In the example illustrated in FIG. 2C, the mouse 100 is an optical mouse that includes a light source 225 and a light detector 230. The light source 225 may include a light-emitting diode (LED) or other light source. The light detector 230 may include an array of photodiodes that may be used to detect movement of the mouse 100 relative to a surface on which the mouse is resting. The mouse 100 may include a controller, processor, and/or other circuitry and components (not shown) for processing the signals received by the light detector 230. In the implementation illustrated in FIG. 2C, the light source 225 and the light detector 230 are disposed in an aperture 220 through the panel 205. Other implementations may not include the panel 205 and the light source 225 and the light detector 230 may be disposed on a bottom surface of the mouse 100, e.g., within one or more apertures of a cover of the mouse 100.

The mouse 100 may also include a wireless transceiver 240 that may be used to wirelessly communicate with a computing device 120. The wireless transceiver 240 may be configured to support Bluetooth and/or other such wireless communications protocols. While the wireless transceiver 240 is illustrated as being disposed on the underside of the mouse 100, the wireless transceiver 240 may be disposed in different locations within the mouse 100. The location of the wireless transceiver 240 may depend, at least in part, on the underlying structure of the deformable body of the mouse 100. The examples which follow provide details of how the deformable body of the mouse 100 may be implemented to permit the mouse 100 to be folded into the compact configuration and/or expanded into the configuration in which the mouse 100 is usable for providing inputs to the computing device 120.

The mouse 100 may have a feedback unit 250 that is configured to provide haptic and/or audio feedback to the user in response to the user touching one of the touch sensitive regions, such as the touch sensitive regions 105a, 105b, or 110 discussed in the preceding examples. The feedback unit may be configured to generate a vibration in response to the user touching one of the touch sensitive regions to provide a sensation the user that may simulate the feeling of clicking a physical button or scrolling of a physical scroll wheel. The feedback unit may include a speaker that outputs a sound when a touch sensitive region is touched. The feedback unit 250 may select, from a computer-readable memory of the mouse, an audio signal to be output that is associated with the touch sensitive region that was touched. The feedback unit 250 may output an audio signal that sounds similar to the clicking sound produced by clicking a physical button like those used on many computer mice in response to the user touching a touch sensitive region that simulate a button or may output an audio signal that sounds similar to that produced by a physical scroll. The feedback unit 250 may provide visual feedback to the user, such as lights to indicate a status of the mouse (e.g., pairing status, battery status, operational status, etc.). The visual feedback may come from lights positioned on a surface of the mouse 100, e.g., within a cover of the mouse or disposed within apertures of the cover.

The mouse 100 may have a controller 260. The controller 260 may be configured to receive signals from one or more of the components of the mouse 100 and to send one or more control signals to one or more of the components of the mouse 100. The controller 260 may be implemented by a microprocessor or other type or hardware logic components, such as but not limited to Application-Specific Integrated Circuits (ASICs), Application-Specific Standard Products (ASSPs), etc. The controller 260 may be configured to send data to and receive data from the computing device 120 via the wireless transceiver 240. For example, the controller 260 may send control signals to the computing device that represent tactile inputs to one or more touch sensitive areas of the mouse and/or representing movement of the mouse across a surface. The computing device 120 may receive this control signals and may control the movements of a mouse pointer and/or perform other actions on the computing device 120 in response to these control signals.

FIG. 3A is a view of the underside of the deformable body 300 of the mouse 100. The cover of the mouse has been removed in FIG. 3A so that the underlying structure of the deformable body 300 of the mouse 100 can be seen. FIG. 3B provides another example view of the deformable body 300 of the mouse 100 illustrated in FIG. 3A. In the example illustrated in FIG. 3B, the deformable body 300 is in the folded configuration. FIGS. 3A and 3B have also omitted other elements, such as the panel 205, the magnets 210a-210d, the inductive charging coil 215, the light source 225, the light detector 230, and the wireless transceiver 240 illustrated in the previous figures to more clearly illustrate the components of the deformable body 300.

The deformable body 300 includes end portions 310a and 310b and a central portion 330 disposed between the end portions 310a and 310b. The central portion 330 is flexible and permits the deformable body 300 to be formed into the expanded configuration as shown in the expanded configuration, as show in FIGS. 1A, 1C, 3A, 3C, 4A, 4C, 5A, 5C, 6A, 6C, and 7A or into the folded configuration, as shown in FIGS. 1C, 3B, 4B, 4D, 5B, 5D, 6B, 6D, 7B and 7C. In the example illustrated in FIG. 3A, the central portion 330 includes a series of articulated segments or ribs 305 arranged in a spatially consecutive arrangement. The example illustrated in FIG. 3A includes three articulated segments 305a, 305b, and 305c. In other implementations, the deformable body may include as few as one articulated segment 305 or more than the three articulated segments 305 illustrated in FIG. 3A.

The articulated segments 305a-305c and the end portions 310a and 310b may be constructed of a rigid or semi-rigid material, such as but not limited to metal or plastic. The end portions 310a and 310b are substantially flat, and one or more components of the mouse 100 may be disposed on the end portions 310a and 310b, such as but not limited to the panel 205, the magnets 210a-210d, the inductive charging coil 215, the light source 225, the light detector 230, and the wireless transceiver 240.

The articulated segments 305a, 305b, and 305c are each connected to at least one other articulated segment 305 or one of the end portions 310a and 310b via hinge components. In the example of FIG. 3A, a pair of hinge components 315 and 325 connect each of the articulated segments 305a, 305b, and 305c to another articulated segment or to one of the end portions 310a and 310b. In other implementations, the articulated segments 305a, 305b, and 305c are each connected to at least one other articulated segment 305 or one of the end portions 310a and 310b via a single hinge component. The use of multiple hinge components to connect the articulated segments provides the technical benefit of stabilizing the deformable body 300 reduce the likelihood of the deformable body 300 twisting laterally.

The hinge components 315a-315c and 325a-325c may be configured to maintain a position of the hinge in a fixed position unless pressure is applied to the end portions 310a and 310b and/or one or more of the articulated segments 305a-305c. The hinge components 315a-315c and 325a-325c may be configured to maintain the position the hinges using friction or using tension applied by a spring or other biasing element that maintains the position of the hinge. A technical benefit of the hinge components 315 and 325 is that the hinge components provide sufficient flexibility to the mouse 100 that allow a user to adjust the shape of the mouse between the folded configuration and the expanded configuration but are provide sufficient rigidity to maintain the shape of the mouse 100 in the folded configuration keep the mouse affixed to the case of a computing device and the expanded configuration to permit a user to use the mouse as a means for providing inputs to the computing device.

The hinge components 315a-315c may include one or more cross-member elements that link the hinge components 315a-315c into a series, such that when a force is applied to one of the hinge components 315a-315c, the force is distributed across each of the hinge components 315a-315c to cause the hinge components 315a-315c to move together in tandem. Similarly, the hinge components 325a-325c may include one or more cross-member elements that link hinge components 325a-325c into a series, such that when a force is applied to one of the hinge components 325a-325c, the force is distributed across each of the hinge components 325a-325c to cause the hinge components 325a-325c to move together. Linking the hinge components into a series provides for smoother movement of the central portion 330 of the deformable body 300 of the mouse 100 because the hinge components work in concert with one another rather than independently. Additional details of the hinge components will be discussed in the examples that follow.

Figure 3C:
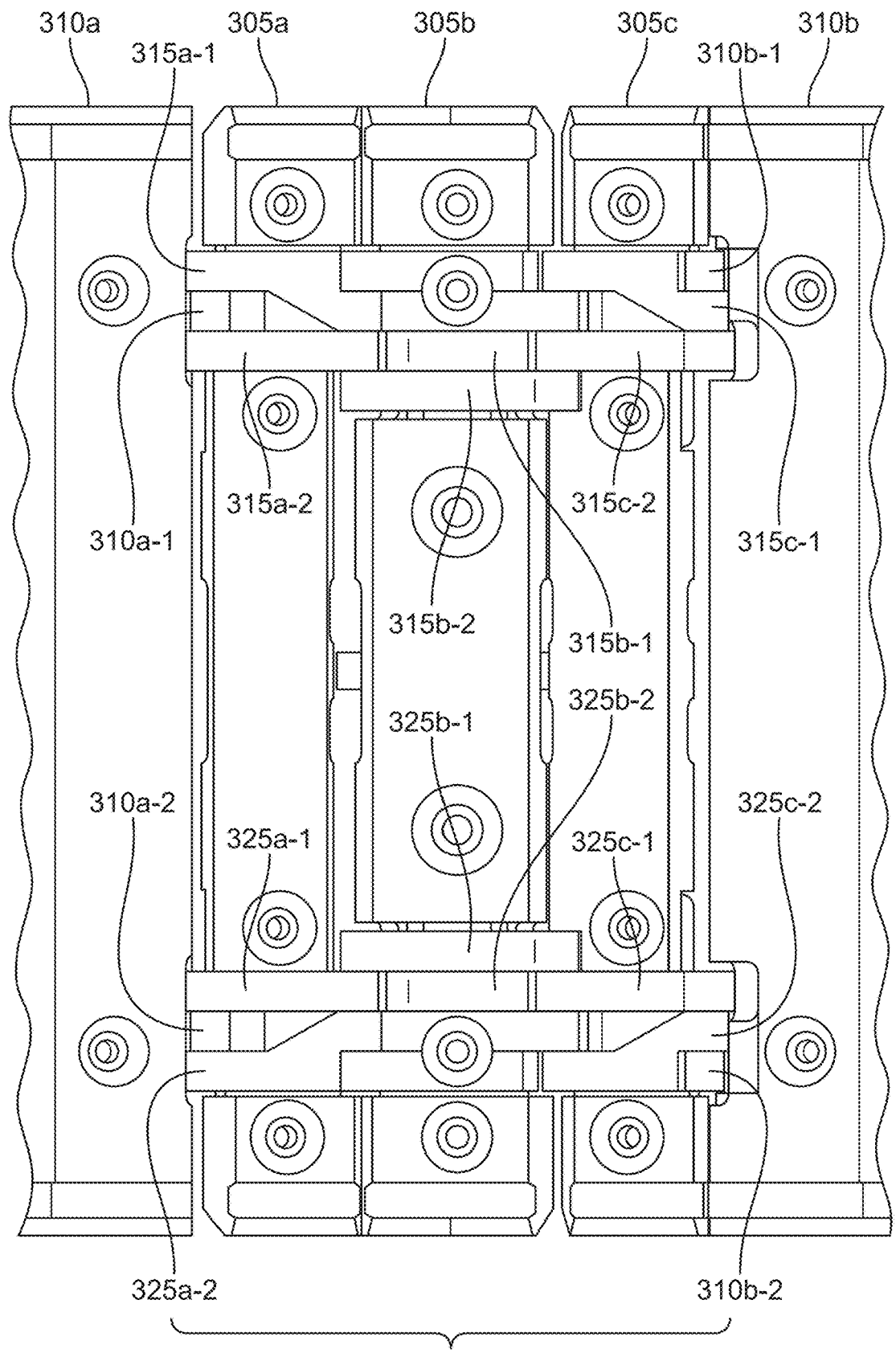
FIG. 3C shows a magnified view of the central portion of the underside of the deformable body of the foldable mouse from the preceding figures.

FIG. 3C shows another view of the central portion 330 that provides additional details of the hinge components 315a-315c and 325a-325c of the deformable body 300 of the mouse 100. The hinge component 315a includes a first connector 315a-1 and a second connector 315a-2, the hinge component 315b includes a first connector 315b-1 and a second connector 315b-2, and the hinge component 315c includes a first connector 315c-1 and a second connector 315c-2. The hinge component 325a includes a first connector 325a-1 and a second connector 325a-2, the hinge component 325b includes a first connector 325b-1 and a second connector 325b-2, and the hinge component 325c includes a first connector 325c-1 and a second connector 325c-2. Additional details of the connectors associated with each of the hinge components 315a-315c and 325a-325c are illustrated in FIGS. 4C, 4D, 5C, 5D, 6C, and 6D.

Figure 4B:
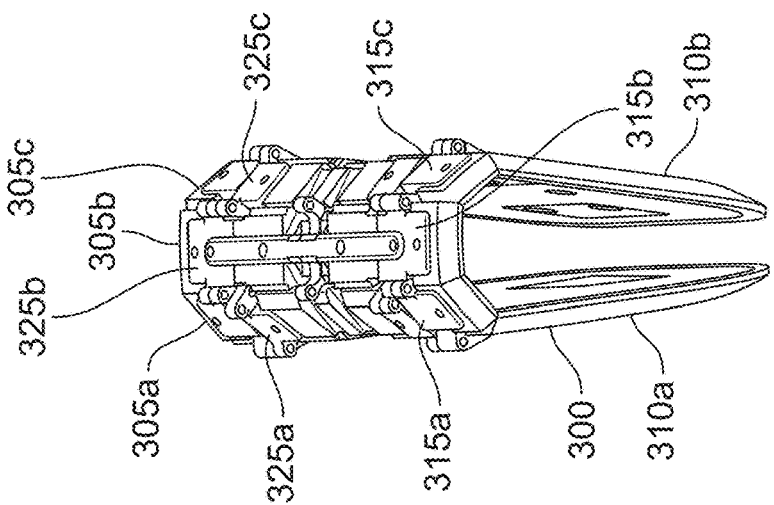
FIG. 4B shows another example view of the deformable body that illustrates the top side of the deformable body and in which the deformable body in the folded configuration.
Figure 4A:
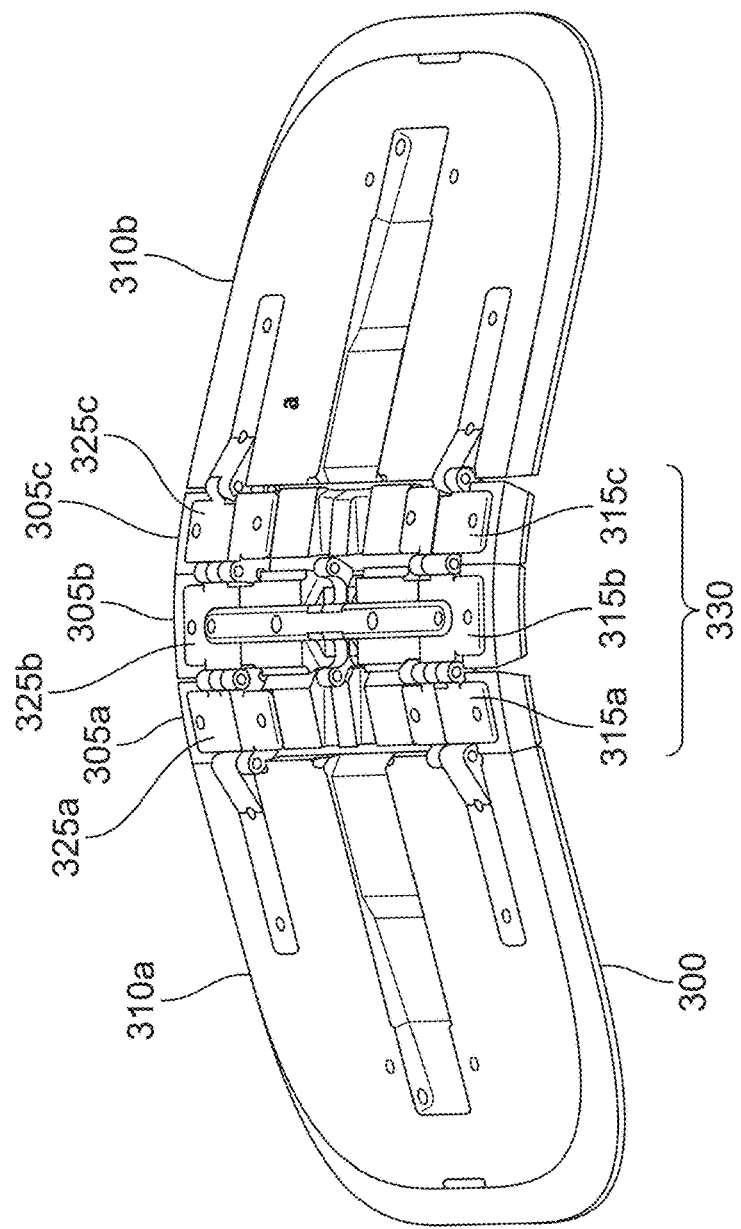
FIG. 4A shows another example view of the deformable body of the foldable mouse that illustrates the top side of the deformable body and in which the deformable body in the expanded configuration.
Figure 4C:
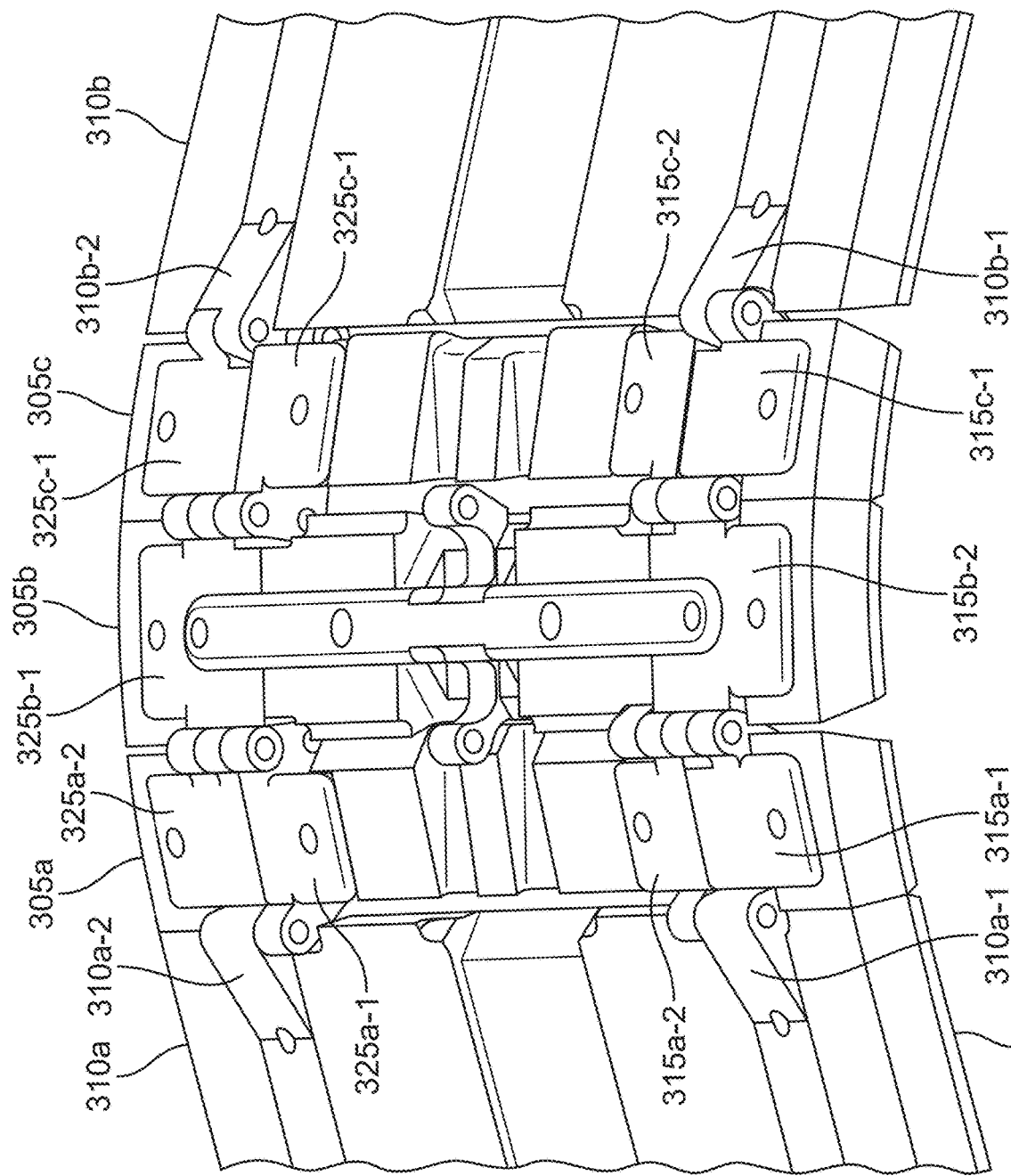
FIG. 4C shows a magnified view of the central portion of the top side of the deformable body of the foldable mouse from FIG. 4A.
Figure 4D:
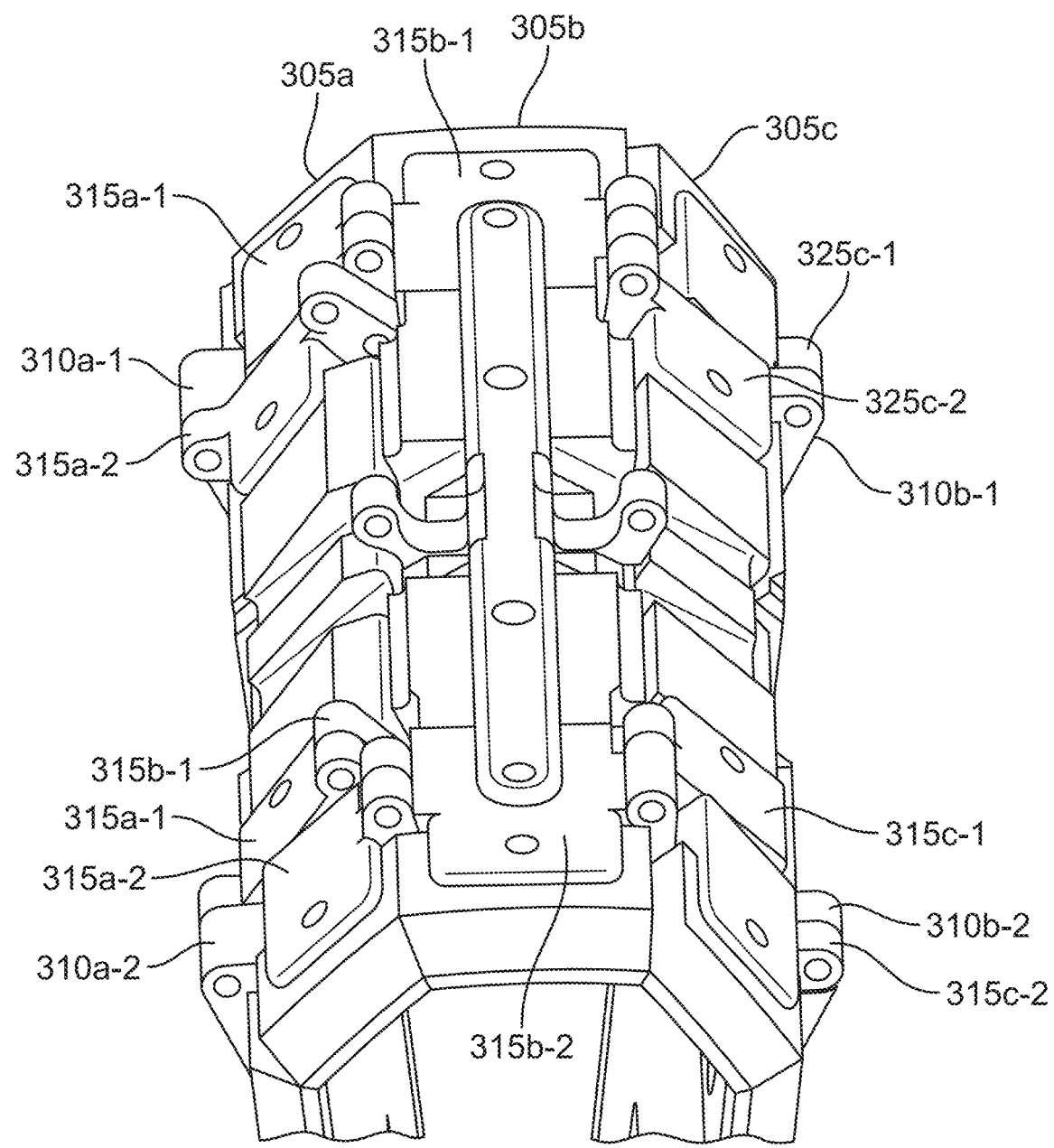
FIG. 4D shows a magnified view of the central portion of the top side of the deformable body of the foldable mouse from FIG. 4B.

FIG. 4A shows another example view of the deformable body 300 that illustrates the top side of the deformable body 300 and in which the deformable body 300 in the expanded configuration. FIG. 4B shows another example view of the deformable body 300 that illustrates the top side of the deformable body 300 and in which the deformable body 300 in the folded configuration. FIGS. 4A and 4B provide additional details regarding the configuration of the hinge components 315a-315c and the hinge components 325a-325c. FIG. 4C shows a magnified view of the hinge components 315a-315c and the hinge components 325a-325c while the deformable body 300 of the mouse 100 is in the expanded configuration. FIG. 4D shows a magnified view of the hinge components 315a-315c and the hinge components 325a-325c while the deformable body 300 of the mouse 100 is in the expanded configuration.

Figure 5B:
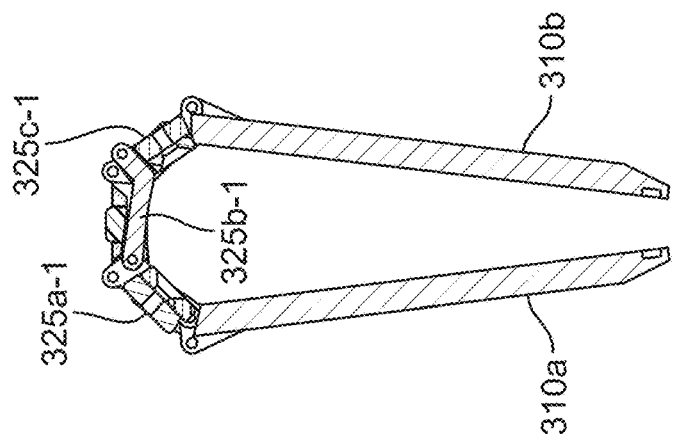
FIG. 5B shows a section view of the deformable body of the mouse in which the mouse is in the folded configuration.
Figure 5A:
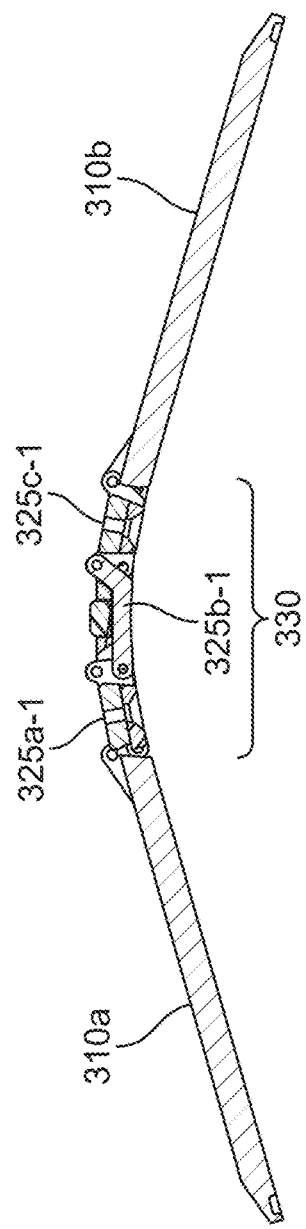
FIG. 5A shows a section view of the deformable body of the foldable mouse in which the mouse is in the expanded configuration.
Figure 5C:
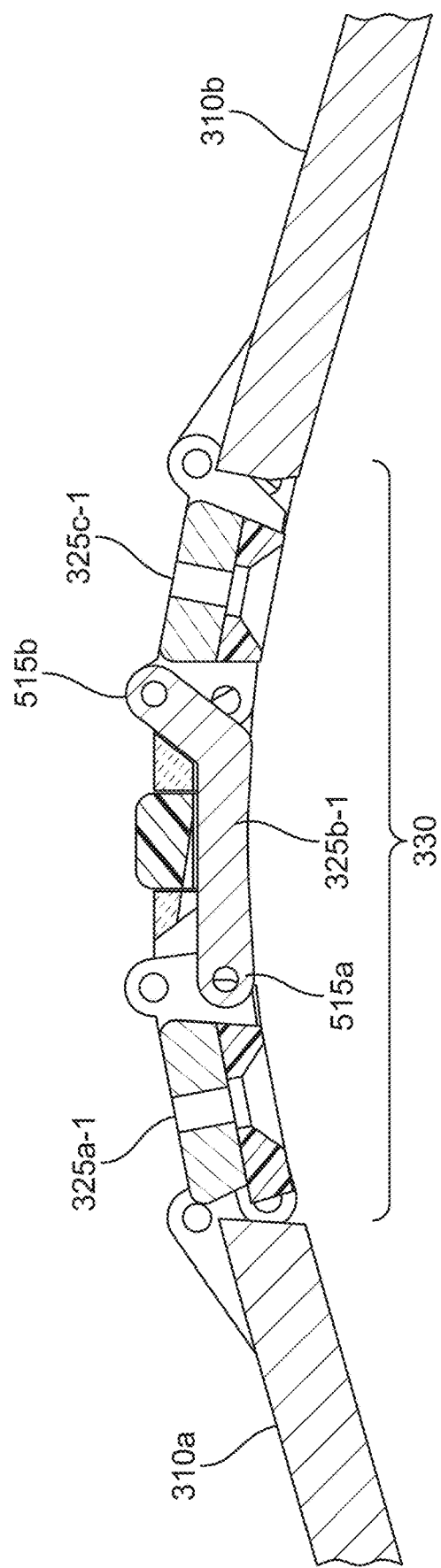
FIG. 5C shows a magnified view of the central portion of the section view of FIG. 5A.
Figure 5D:
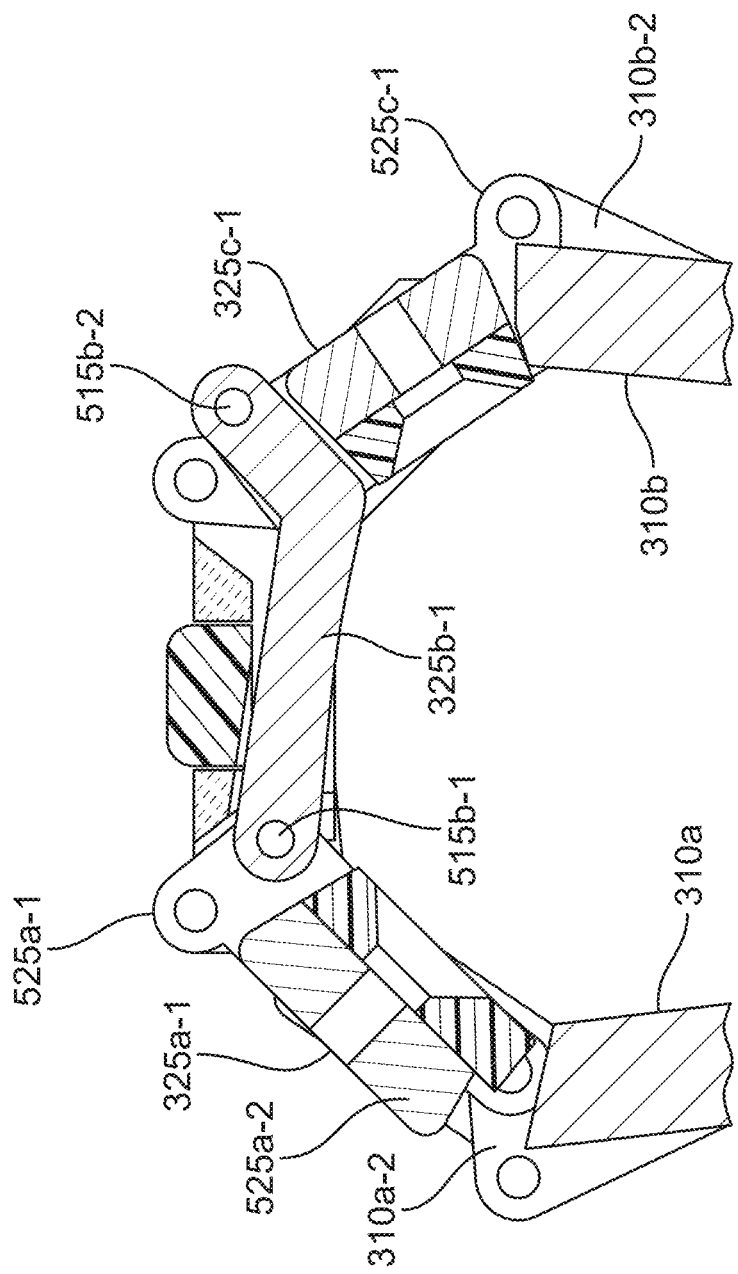
FIG. 5D shows a magnified view of the central portion of the section view of FIG. 5B.

FIGS. 5A-5D are diagrams showing section views of the deformable body 300 of the of the mouse 100 that show details of the hinge components 315a-315c and the hinge components 325a-325c. FIG. 5A shows a section view in which the deformable body 300 of the mouse 100 in in the expanded configuration. FIG. 5B shows a section view in which the deformable body 300 of the mouse 100 in in the folded configuration. FIG. 5C provides a magnified view of the hinge components 315a-315c and the hinge components 325a-325c while the deformable body 300 of the mouse 100 is in the expanded configuration, and FIG. 5D provides a magnified view of the hinge components 315a-315c and the hinge components 325a-325c while the deformable body 300 of the mouse 100 is in the folded configuration.

Figure 6B:
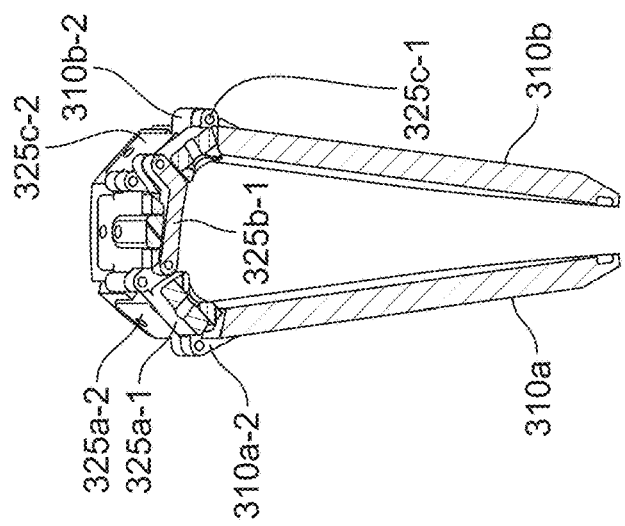
FIG. 6B shows a section view of the deformable body of the mouse in which the mouse is in the folded configuration.
Figure 6A:
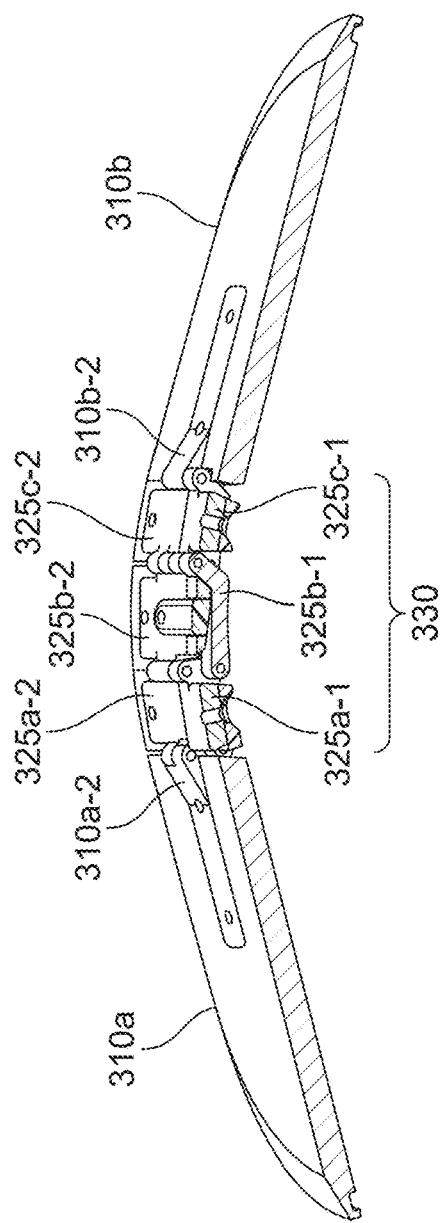
FIG. 6A shows a section view of the deformable body of the mouse in which the mouse is in the expanded configuration.
Figure 6C:
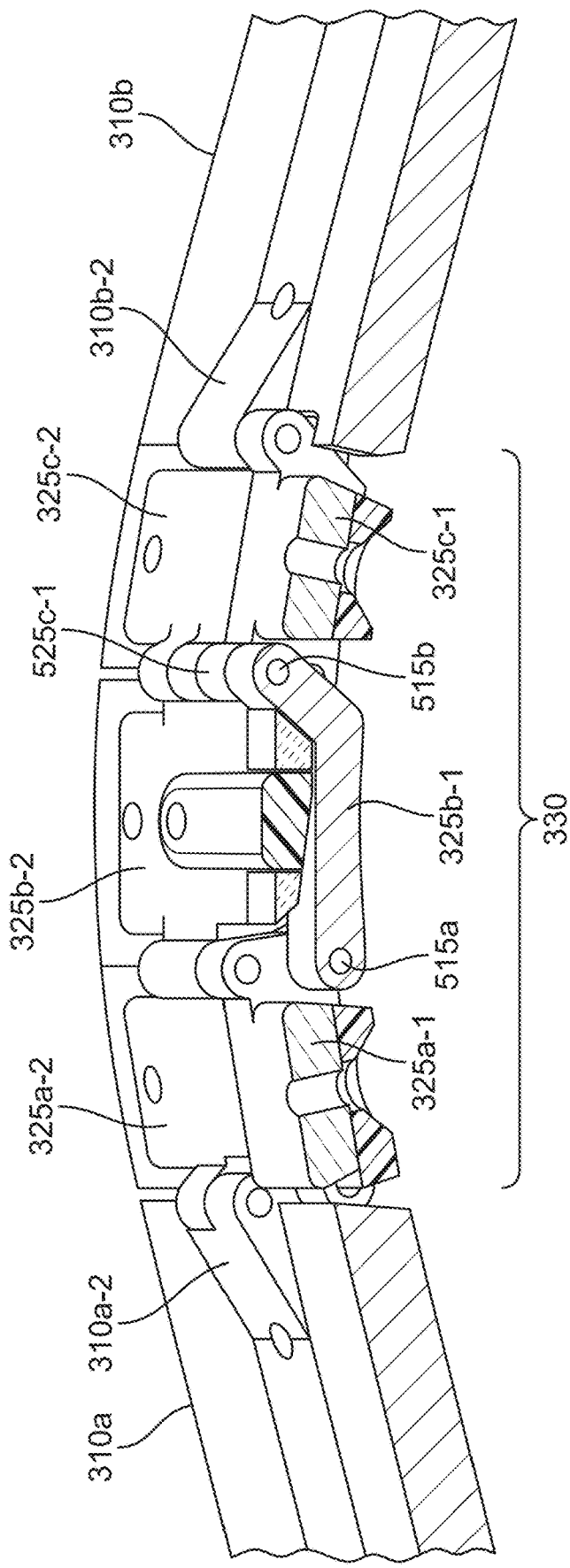
FIG. 6C shows a magnified view of the central portion of the section view of FIG. 6A.
Figure 6D:
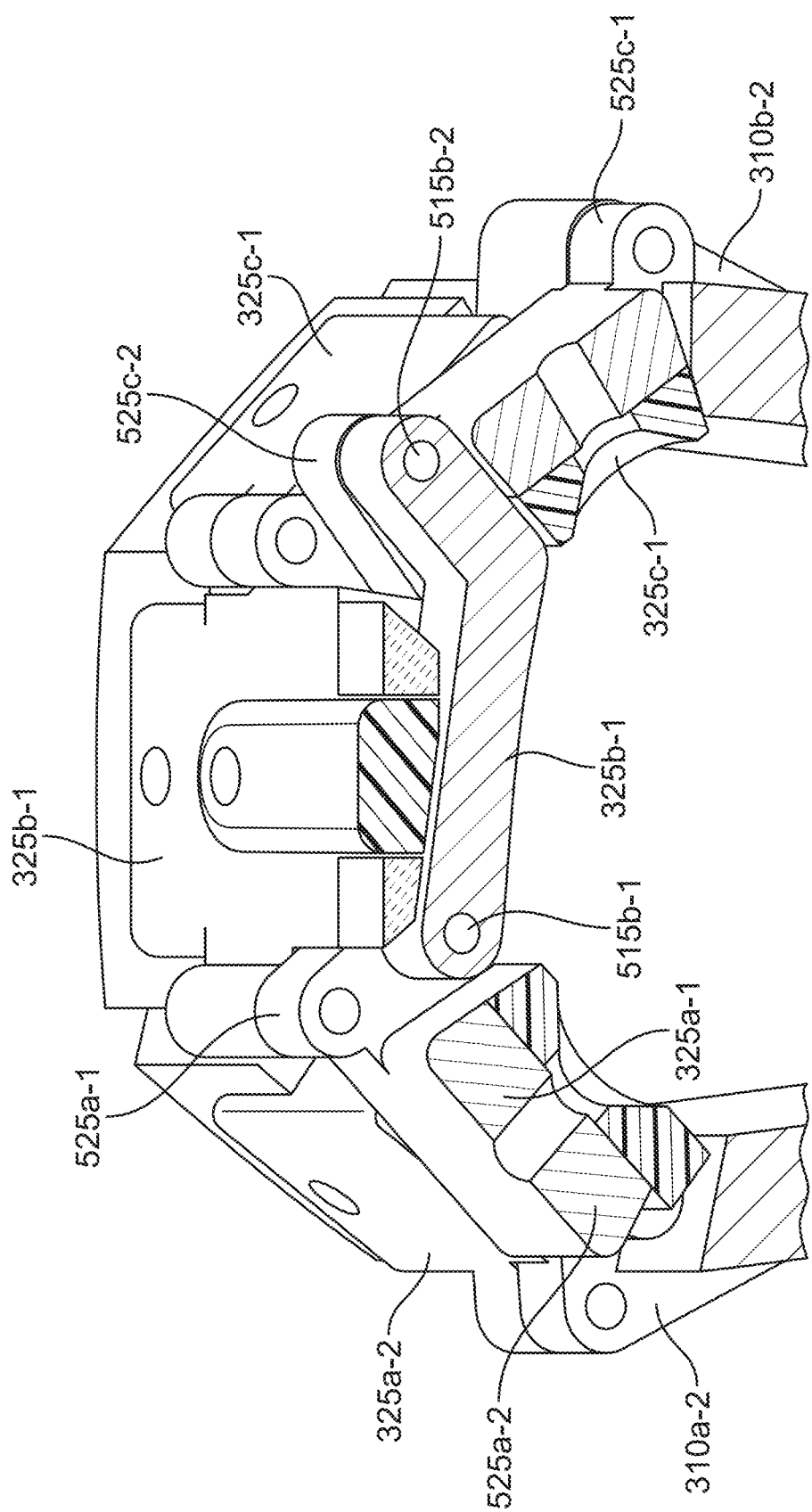
FIG. 6D shows a magnified view of the central portion of the section view of FIG. 6B.

FIGS. 6A-6D are diagrams showing additional section views of the deformable body 300 of the of the mouse 100 that illustrates how the hinge components 315a-315c and the hinge components 325a-325c. FIG. 6A shows a section view in which the deformable body 300 of the mouse 100 in in the expanded configuration. FIG. 6B shows a section view in which the deformable body 300 of the mouse 100 in in the folded configuration. FIG. 6C provides a magnified view of the hinge components 315a-315c and the hinge components 325a-325c while the deformable body 300 of the mouse 100 is in the expanded configuration, and FIG. 6D provides a magnified view of the hinge components 315a-315c and the hinge components 325a-325c while the deformable body 300 of the mouse 100 is in the folded configuration.

FIGS. 5C, 5D, 6C, and 6D illustrates how the cross-member connector elements of the hinge components 315a-315c and 325a-325c may work in series with one another to distribute force across each of the hinge components 315a-315c and 325a-325c when force is applied to one or both of the end portions 310a and 310b. The use of the connectors allows the deformable body 300 to be smoothly folded into the folded configuration or opened into the expanded configuration.

FIGS. 5C and 5D show that the connector 315b-2 may have substantially an L-shape with a first end 515b-1 and a second end 515b-2. The connector 315b-2 has a first hinge knuckle (also referred to herein as a joint or node) at the first end 515b-1 and a second hinge knuckle at the second end 515b-2. A first pin (not shown) passes through the first hinge knuckle at the first end 515b-1 and into a corresponding hinge knuckle (not shown) on the first connector 325a-1 as can be seen in the FIGS. 6C and 6D. A second pin (not shown) passes through the second hinge knuckle at the second end 515b-2 and passes through a corresponding hinge knuckle 525c-1 on the connector 325c-1. As can be seen in FIGS. 5C and 5D and in FIGS. 6C and 6D, the connector 315b-2 is configured to pivot as the deformable body 300 of the mouse 100 moves from the folded configuration to the expanded configuration.

If pressure is exerted on the end portion 310b to cause the deformable body to move toward the folded configuration from the expanded configuration, the first end 525c-1 of the connector 325c-1 pivots downward causing the second end 525c-1 of the connector 325c-1 to pivot upward. A technical benefit of this configuration is that the user may exert pressure on one or both of the end portions 310a and 310b of the deformable body of the mouse to move the mouse to the expanded configuration and the connectors distribute the force along the deformable body to make moving the deformable body 300 of the mouse between the expanded configuration and the folded configuration and vice versa. The second end 525c-2 of the connector 325c-1 is connected to the second end of the 515b-2 of the connector 315b-2, and the upward motion of the second end 515c-2 causes the second end of the 515b-2 of the connector 315b-2 to pull downward and the first end 515b-1 to pivot upward. The first end 515b-1 of the connector 315b-2 is connected to the first end 525a-1 of the connector 325a-1, which causes the first end 515a-1 of the connector 325a-1 to pivot upward and the second end 515a-2 of the connector 325a-1 to pivot downward, which in turns causes the end portion 310a to pivot toward the folded configuration.

If pressure is exerted on the end portion 310a to cause the deformable body 300 to move toward the folded configuration from the expanded configuration, downward pressure will be exerted on the second end 515a-2 of the connector 325a-1 causing the second end 515a-2 to pivot downward and the first end 515a-2. The first end 525a-1 of the connector 325a-1 will pivot upward, causing the first end 515b-1 of the connector 315b-2 to pivot upward. This in turn causes the second end 515b-2 of the connector 315b-2 to pivot downward, which causes the second end 525c-2 of the connector 325c-1 to pivot with the second end 515b-2 of the connector 315b-2. The first end 525c-1 of the will pivot downward causing the end portion 310b to move toward the folded configuration.

If pressure is exerted on the end portion 310b to cause the deformable body 300 to move toward the expanded configuration from the folded configuration, the first end 525c-1 of the connector 325c-1 pivots upward, causing the second end 525c-2 to pivot downward. This causes the second end 515b-2 of the connector 315b-2 to pivot upward and the first end 515b-1 of the connector to pivot downward, which causes the first end 525a-2 of the connector 325a-1 to pivot upward. The second end 325a-2 of the connector 325a-1 pivoting upward causes the end portion 310a to pivot upward toward the expanded configuration. If pressure is exerted on the end portion 310a to cause the deformable body 300 to move toward the expanded configuration from the folded configuration, the second end 325a-2 of the connector 325a-1 pivots upward, which causes the first end 515b-1 of the connector 315b-2 to pivot downward and the second end 515b-2 to pivot upward. As a result, the second end 515c-2 of the connector 325c-1 pivots downward, and the first end 515c-1 of the connector 325c-1 pivots upward. The end portion 310b-2 also then pivots upward toward the expanded configuration. While the preceding examples illustrate the operation of elements of the hinge components 325a-325c, the hinge components 315a-315c may include similar features that cause the hinge components 315a-315c to operate in tandem in a similar manner as the operation of the hinge components 325a-325c discussed above.

Figure 7A:
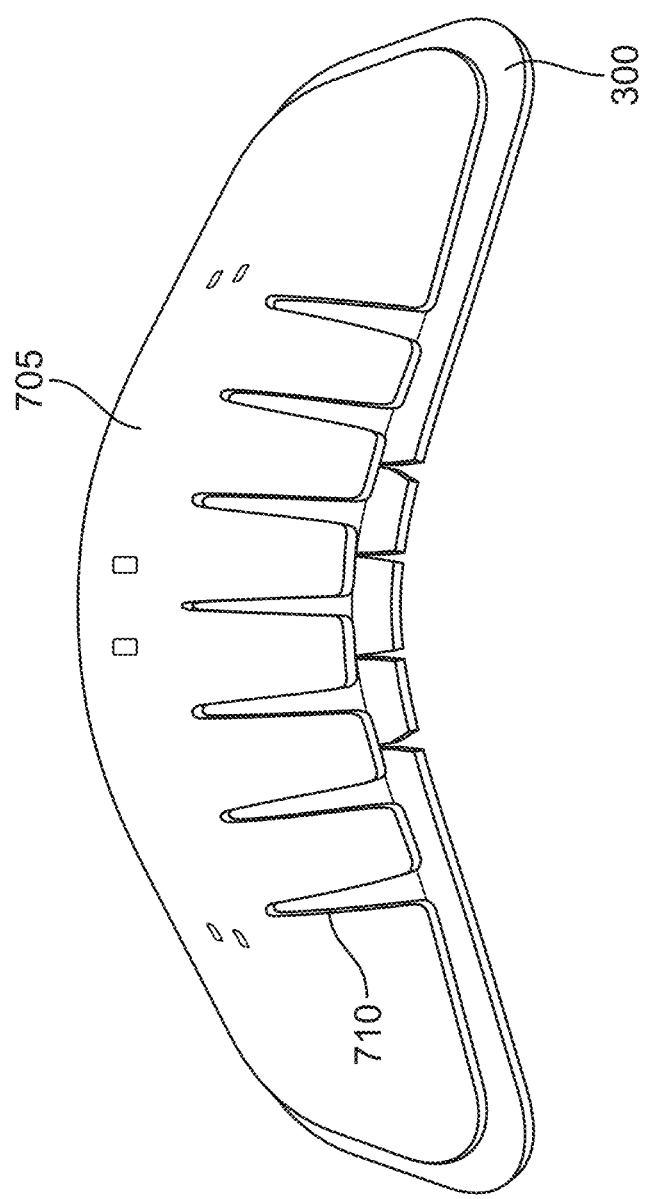
FIG. 7A shows a view of the deformable body of the mouse with an expandable shell disposed on the top surface of the deformable body of the foldable mouse.

FIG. 7A is a diagram showing a view of the mouse 100 which shows the deformable body 300 including an expandable shell 705 affixed to the top side of the deformable body 300. The expandable shell 705 is configured such that a portion of the deformable body expands into an ergonomic shape for holding the mouse when the deformable body is formed into the first expanded configuration. In this example, the expandable shell 705 is a hollow shell of a flexible but semi-rigid material, such as but not limited to low-density polyethylene (LDPE) or polypropylene. FIG. 7A show the deformable body 300 of the mouse 100 in the expanded configuration with the shell 705 expanded. The expandable shell 705 is capable of retaining its shape when in the expanded configuration to provide a more ergonomic shape to form to the mouse 100 but is also flexible enough to be folded flat or substantially flat against the deformable body 300 of the mouse 100 when the mouse 100 is in the folded configuration.

The expandable shell 705 may include a plurality of slots along the length of each side of the expandable shell 705 that facilitate flattening the expandable shell 705 against the deformable body 300 of the mouse 100 when the mouse is in the folded configuration. The expandable shell 705 may be covered by a cover, such as that illustrated in FIG. 8, and sensors providing one more touch sensitive regions, such as the touch sensitive regions 105a, 105b, and 110 discussed in the preceding examples, may be disposed on the top surface of the expandable shell 705 and/or on the cover material.

Figure 7C:
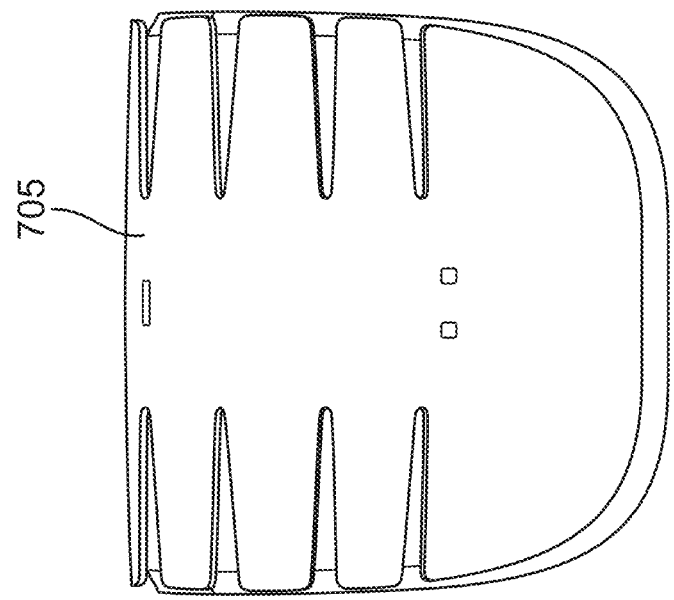
FIG. 7C shows another view of the deformable body of the foldable mouse in the folded configuration with an expandable shell disposed on the top surface of the deformable body of the foldable mouse.
Figure 7B:
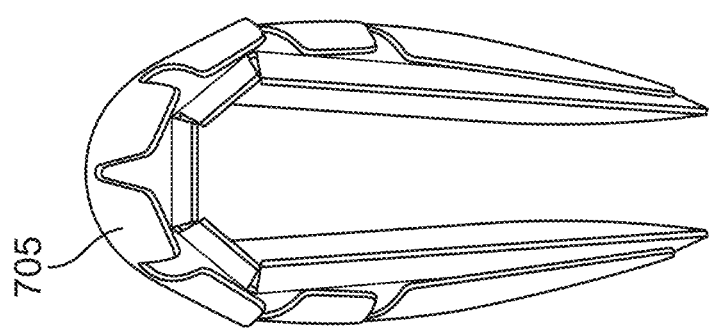
FIG. 7B shows a view of the deformable body of the foldable mouse in the folded configuration with an expandable shell disposed on the top surface of the deformable body.

FIGS. 7B and 7C show examples of the mouse 100 in the folded configuration in which the expandable shell 710 is flat against or substantially flat against the top surface of the deformable body 300 of the mouse 100.

FIG. 8 illustrates an example of the mouse 100 with a knitted cover 800. The cover is soft and flexible so as to not interfere with the ability of the mouse 100 to be folded into the folded configuration or expanded into the expanded configuration. The mouse is shown in FIG. 8 in the expanded configuration. The cover 800 may be made of a material that is elastic such that the cover is capable of stretching while in the folded configuration and contracting while in the expanded configuration. The cover may be made of a material that is soft so that the mouse 100 is more comfortable to hold for a user. The cover material may be non-metallic to allow the mouse 100 to include one or more magnets that can be used to affix the mouse to a computing device, such as the computing device 120 from the preceding examples. The cover material may also include one or more openings, such as for the light source 225 and the light detector 230 in the preceding examples. In some implementations, the cover 800 includes capacitive regions (e.g., using capacitive threads) to provide touch sensitive buttons as described above. In some implementations, the cover includes one or more light emitting regions (e.g., using light emitting threads or fibers) to provide visual feedback to the user.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A computer mouse comprising:
a deformable body configurable to be formed into a first expanded configuration usable for receiving inputs for controlling a computing device and a second folded configuration in which a first portion of the deformable body is folded over a second portion of the deformable body, wherein:
the deformable body comprises a plurality of articulated segments arranged in a spatially consecutive arrangement and a plurality of hinges,
each articulated segment of the plurality of articulated segments is connected to at least one adjacent articulated segment via a hinge of the plurality of hinges, and
the plurality of hinges associated with the plurality of articulated segments are interconnected with pivoting connectors to cause the plurality of hinges to operate in tandem;
an input sensor disposed on the deformable body and configured to detect tactile input from a user;
a motion tracking component disposed on the deformable body and configured to detect movement of the computer mouse; and
a communications component configured to wirelessly communicate tactile input and motion tracking data to the computing device.

2. The computer mouse of claim 1, wherein the deformable body, while in the second folded configuration, forms a first arcuate configuration that conforms to an exterior housing of the computing device.

3. The computer mouse of claim 2, wherein the deformable body, while in the first expanded configuration the deformable body forms a second arcuate configuration having a second curvature that is smaller than a first curvature of the first arcuate configuration of deformable body in the second folded configuration.

4. The computer mouse of claim 1, wherein the plurality of hinges each comprise a friction hinge that is configured to maintain a position of the friction hinge using friction.

5. The computer mouse of claim 1, wherein at least a portion of the deformable body expands into an ergonomic shape for holding the mouse when the deformable body is formed into the first expanded configuration.

6. The computer mouse of claim 1, wherein the deformable body comprises a shell that expands to the first expanded configuration when the deformable body is expanded to the first expanded configuration, and wherein the shell collapses against the deformable body when the deformable body is folded into the second folded configuration.

7. The computer mouse of claim 1, wherein the input sensor comprises a capacitive sensor for detecting the tactile input; and wherein the computer mouse further comprises:
a haptic feedback component configured to generate a haptic output responsive to the input sensor detecting the tactile input.

8. The computer mouse of claim 1, further comprising:
a first inductive charging coil for wirelessly charging a battery of the computer mouse, wherein the first inductive charging coil is configured to magnetically couple with a second inductive charging coil disposed in or on a housing of the computing device.

9. A computer mouse comprising:
a deformable body configurable to be formed into a first expanded configuration usable for receiving inputs for controlling a computing device and a second folded configuration in which a first portion of the deformable body is folded over a second portion of the deformable body, wherein:
the deformable body comprises a plurality of articulated segments arranged in a spatially consecutive arrangement and a plurality of hinges,
each articulated segment of the plurality of articulated segments is connected to at least one adjacent articulated segment via a hinge of the plurality of hinges, and
a first hinge of the plurality of hinges includes at least one connector element configured to apply force to an adjacent second hinge of the plurality of hinges to distribute force applied to the first hinge across to the adjacent second hinge;
an input sensor disposed on the deformable body and configured to detect tactile input from a user;
a motion tracking component disposed on the deformable body and configured to detect movement of the computer mouse; and
a communications component configured to wirelessly communicate tactile input and motion tracking data to the computing device.

10. A computer mouse comprising:
a deformable body configurable to be formed into a first expanded configuration usable for receiving inputs for controlling a computing device and a second folded configuration in which the deformable body is folded along a central portion of the deformable body, wherein:
the deformable body comprises a plurality of articulated segments arranged in a spatially consecutive arrangement and a plurality of hinges,
each articulated segment of the plurality of articulated segments is connected to at least one adjacent articulated segment via a hinge of the plurality of hinges, and
the plurality of hinges associated with the plurality of articulated segments are interconnected with pivoting connectors to cause the plurality of hinges to operate in tandem;
an input sensor disposed on the deformable body and configured to detect tactile input from a user;
a motion tracking component disposed on the deformable body and configured to detect movement of the computer mouse; and
a communications component configured to wirelessly communicate tactile input and motion tracking data to the computing device.

11. The computer mouse of claim 10, wherein the deformable body, while in the second folded configuration, forms a first arcuate configuration that conforms to an exterior housing of the computing device.

12. The computer mouse of claim 11, wherein the deformable body, while in the first expanded configuration the deformable body forms a second arcuate configuration having a second curvature that is smaller than a first curvature of the first arcuate configuration of deformable body in the second folded configuration.

13. A computer mouse comprising:
a deformable body configurable to be formed into a first expanded configuration usable for receiving inputs for controlling a computing device and a second folded configuration in which the deformable body is folded along a central portion of the deformable body, wherein:
   the central portion of the deformable body comprises a plurality of articulated segments arranged in a spatially consecutive arrangement and a plurality of hinges,
   each articulated segment of the plurality of articulated segments is connected to at least one adjacent articulated segment via a hinge of the plurality of hinges, and
   a first hinge of the plurality of hinges includes at least one connector element configured to apply force to an adjacent second hinge of the plurality of hinges to distribute force applied to the first hinge across to the adjacent second hinge;
an input sensor disposed on the deformable body and configured to detect tactile input from a user;
a motion tracking component disposed on the deformable body and configured to detect movement of the computer mouse; and
a communications component configured to wirelessly communicate tactile input and motion tracking data to the computing device.

14. The computer mouse of claim 10, wherein the deformable body comprises a shell that is configured to expand to a first expanded configuration when the deformable body is expanded to the first expanded configuration, and wherein the shell is configured to collapse into a second collapsed configuration against the deformable body when the deformable body is formed into the folded configuration.

15. The computer mouse of claim 10, wherein the input sensor comprises a capacitive sensor for detecting the tactile input, the computer mouse further comprising:
a haptic feedback component configured to generate a haptic output responsive to the input sensor detecting the tactile input.

16. The computer mouse of claim 10, further comprising:
a first inductive charging coil for wirelessly charging a battery of the computer mouse, wherein the inductive charging coil is configured to magnetically couple with a second inductive charging coil disposed in or on a housing of the computing device.

* * * * *